March 12, 1946.  F. H. GOODING  2,396,269
BUOYANT CABLE AND ELECTRODE THEREFOR
Filed Feb. 14, 1942
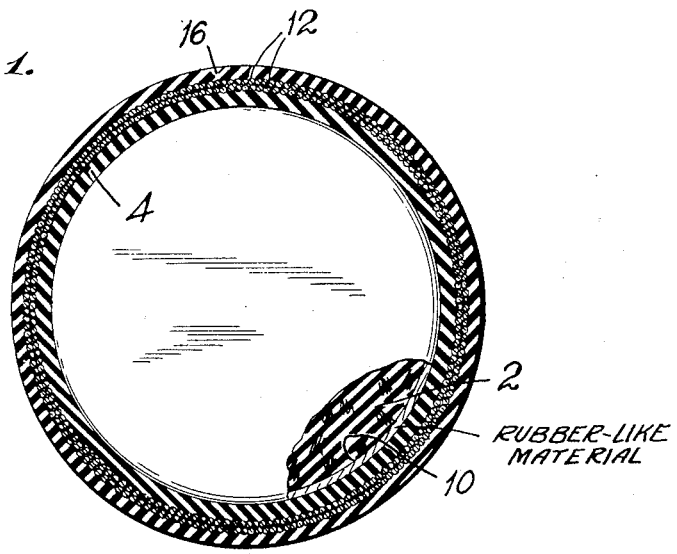
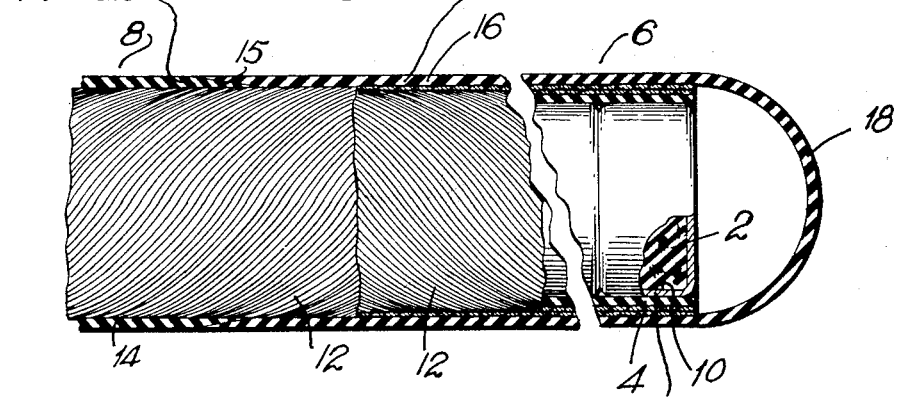
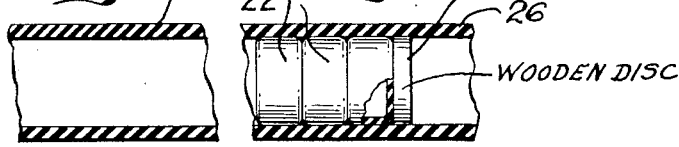
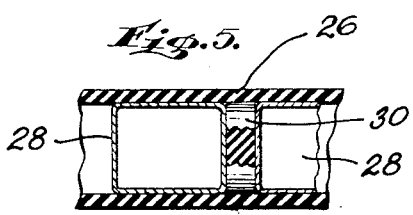
INVENTOR
FRANCIS H. GOODING
BY
Kiddle, Buthell and Montgomery.
ATTORNEYS Patented Mar. 12, 1946

2,396,269

UNITED STATES PATENT OFFICE 2,396,269

BUOYANT CABLE AND ELECTRODE THEREFOR

Francis H. Gooding, Lodi, N. J., assignor to The Okonite-Callender Cable Company, Incorporated, Paterson, N. J., a corporation of New Jersey Application February 14, 1942, Serial No. 430,932

9 Claims. (Cl. 174—102)

This invention is directed to an improvement in buoyant cables and electrodes therefor, the desideratum being a cable and an electrode capable of floating in a medium such as sea-water.

Broadly speaking, the present invention provides a buoyant cable and an electrode therefor comprising a suitable buoyant center, wherein the conductor is made up of a number of small wires or strands laid about this center and surrounded throughout part of their length by a sheath of rubber or other highly water-resistant material, the electrode portion of the assembly being surrounded by a sheath of non-metallic electrically conducting highly water-resistant material such as rubber, natural or synthetic, and rubber-like materials, and containing electrically conducting material such as graphite, carbon black, finely divided metal particles or other highly electrically conducting material, sufficient of this conducting material being employed to provide a radially conducting path from the wires or strands to the surface of the sheath. In this way I provide a construction wherein the metal of the electrode conductor is protected against corrosion from contact with sea-water, for example, yet a radial conducting path is provided from the source of energy, namely, the cable, to the sea-water.

As above indicated, my electrode may be a separate article of manufacture or it may be an integral part of the cable from which it derives its energy and by reason of this fact the appended claims are directed not only to the electrode itself as an article of manufacture but in combination with the cable.

In the accompanying drawing where an embodiment of my invention has been illustrated:

Fig. 1 is a cross section of an electrode constructed in accordance with this invention;

Fig. 2 is a fragmentary sectional elevational view of the electrode and cable;

Figs. 3, 4 and 5 are fragmentary views of various types of centers which I may employ instead of the type shown in Fig. 1.

Referring to the drawing in detail: 2 designates a plurality of cellular rubber members constituting the core of a buoyant center. These buoyant core members are intercalated with wooden discs, for example. For expediency in manufacture the core is enclosed in a continuous sheath 4 of flexible water impervious material such as employed, for instance, in making water hose. This center assembly may constitute the center not only for the electrode itself, which will be designated 6, but the center for a buoyant cable 8 as well. Each core member 2 may be enclosed in a gas impervious, thin sheath of rubber-like material 10.

The cable and electrode conductor take the form of several layers of wires or strands 12 of copper, or aluminum, for example, laid up about the core sheath 4, the wires or strands of one layer being laid up about the core members oppositely to the overlying layer.

The cable 8 is enclosed or encased in a rubber or other water impervious electrically non-conducting sheath 14. So far as the electrode 6 is concerned, it is necessary that an electrically conducting path be provided from the conductor wires or strands 12 radially of the electrode to the medium in which the electrode is floated—sea-water, for example. For this reason, therefore, the electrode is encased in an electrically conducting, non-metallic, water-resistant sheath 16 which may be rubber, natural or synthetic, or other rubber-like material, containing graphite, carbon black, finely divided metal particles or other highly electrically conducting material in sufficient quantity to provide a good electrically conducting path from the wires or strands 12 radially to the surface of the sheath 16.

This conducting sheath 16 joins the non-conducting sheath 14 at 15 and, in effect, constitutes a continuation of the non-conducting sheath 14 of the cable. The outer end of the electrode is hermetically sealed in any suitable fashion, for example, by simply forming the sheath 16 so that it completely encloses and hermetically seals the outer end of the electrode, as shown at 18 in Fig. 2.

It will be understood that the weight to volume ratio of the cable and electrode is such as to render the entire structure buoyant, that is, capable of floating in water as, for example, sea-water.

In Fig. 3 I have shown a buoyant center about which the wires 12 may be laid, in place of the buoyant center of Fig. 1. The center of Fig. 3 is a tubular rubber member 20. It may be self-sustaining or it may be kept under slight internal pressure.

The center shown in Fig. 4 is composed of hollow rubber members 22 intercalated with wooden discs 24. In order that the application of the wires or strands 12 may be expedited this assembly may be enclosed in a continuous rubber sheath 26.

In Fig. 5 I have illustrated still another type of center comprising hermetically sealed hollow metal members 28 intercalated with cellular or hollow rubber discs 30. Inasmuch as the conducting wires 12 are to be laid up about this center it is of advantage to enclose the center in a continuous water-resistant sheath 26.

It will be appreciated that by my improved construction the wires or strand 12, while maintained by the sheath 16 out of physical contact with the sea-water or other medium in which the electrode is to be floated, are at the same time electrically connected to this medium by the sheath 16 which, as above explained, is deliberately made electrically conducting so as to provide a radially conducting continuous wall through which current will pass radially all the way from the wires 12 to the outside surface of the sheath.

It will be appreciated, also, that by making up the conductor from small wires or strands, some of these conducting wires may be ruptured, without, however, unfitting the electrode for further use.

It will be appreciated, furthermore, that by my construction manufacture is expedited and costs reduced as compared with constructions where the electrode and cable are made separately and mechanically united. I wish it to be understood, however, that where it is so desired the electrode may be made up separately and spliced in any suitable watertight fashion to the cable.

It is to be understood that changes may be made in the details of construction as hereinabove described without departing from the spirit and scope of my invention.

What I claim is:

1. A buoyant electrode comprising in combination a buoyant core element, a plurality of uninsulated electrically conducting wires or strands laid up around said core element, and a non-metallic, water-resistant, electrically conducting sheath surrounding and contacting said wires or strands for conducting the current of the electrode flowing along the said wires or strands to the outside surface of the sheath radially of the electrode.

2. A buoyant electrode comprising in combination a core element, a plurality of uninsulated metal strands laid up in layers about said core element, the strands of one layer being laid up oppositely to the strands of the overlying layer, and a non-metallic water-resistant, electrically conducting sheath surrounding and contacting said wires or strands for conducting the current of the electrode flowing along the said wires or strands to the outside surface of the sheath radially of the electrode, the weight to volume ratio of said electrode being such as to render the electrode buoyant.

3. An electrode comprising in combination a core element, a plurality of bare aluminum wires laid up in layers about said core element, the wires of one layer being laid oppositely to those of the overlying layer, and a sheath of non-metallic, water-resistant material surrounding said wires, the material of said sheath containing electrically conducting material for conducting the electrode current flowing along the said wires to the outside surface of the sheath radially of the electrode, the weight to volume ratio of said electrode being such as to render the electrode buoyant.

4. An integral cable and electrode comprising in combination an elongated core element, a plurality of continuous bare metal wires or strands laid up about said core element and constituting conductors for the cable and electrode, and a non-metallic, water-resistant continuous sheath structure surrounding and contacting said wires or strands, the sheath throughout the cable portion of the structure being non-conducting and throughout the electrode portion being sufficiently electrically conducting to provide a radially conducting continuous wall for conducting the current of the electrode flowing along the said wires or strands to the outside surface of the sheath radially of the electrode, the weight to volume ratio of the structure being such as to render the structure buoyant.

5. An integral cable and electrode comprising in combination an elongated core element, a plurality of bare wires or strands laid up in layers about said core element, the wires or strands of one layer being laid up oppositely to the wires or strands of the succeeding layer, and an enclosing non-metallic, water-resistant sheath, the sheath contacting said wires or strands and containing an electrically conducting medium throughout the length of the electrode and being non-conducting throughout the remainder of its length, the weight to volume ratio of the structure being such as to render the structure buoyant.

6. In an electrode the combination of a center comprising a plurality of cellular rubber members enclosed in a relatively gas impervious skin or sheath, bare wires or strands laid in layers about said center, the wires or strands of one layer extending oppositely to the wires or strands of the succeeding layer, and an enclosing sheath of rubber-like, water-resistant material containing an electrically conducting medium, said sheath contacting said bare wires or strands and providing a radially conducting continuous wall for conducting the current of the electrode flowing along said wires or strands to the outside surface of the sheath radially of the electrode, the weight to volume ratio of the electrode being such as to render the electrode buoyant.

7. In a buoyant electrode, the combination of a core element composed of an elongated continuous tubular member, bare wires or strands laid in layers about said tubular member and constituting the conductors of the electrode, the wires of one layer extending oppositely to those of the succeeding layer, and an enclosing sheath of rubber contacting said bare wires or strands and containing an electrically conducting medium to provide a conducting path for the current of the electrode flowing along the said wires or strands from the said wires or strands to the medium in which the electrode is to be floated, the weight to volume ratio of the electrode being such as to render the electrode buoyant.

8. In a buoyant electrode, the combination of a core element composed of an elongated continuous tubular member under internal pressure, bare wires or strands laid in layers about said tubular member and constituting the conductors of the electrode, the wires of one layer extending oppositely to those of the succeeding layer, and an enclosing sheath of rubber contacting said bare wires or strands and containing an electrically conducting medium to provide a conducting path from the said wires or strands to the medium in which the electrode is to be floated, the weight to volume ratio of the electrode being such as to render the electrode buoyant.

9. In a buoyant electrode, the combination of a core element composed of a plurality of sealed hollow rubber members intercalated with wooden discs, bare wires or strands laid in layers about said members and constituting the conductors of the electrode, the wires of successive layers extending in opposite directions, and an enclosing sheath of electrically conducting water impervious material contacting said bare wires or strands, the weight to volume ratio of the electrode being such as to render the electrode buoyant.

FRANCIS H. GOODING.